United States Patent [19]

Tojo et al.

[11] Patent Number: 5,537,503
[45] Date of Patent: Jul. 16, 1996

[54] OPTICAL SEMICONDUCTOR MODULE AND METHOD OF FABRICATING THE SAME

[75] Inventors: Masaaki Tojo; Noboru Kurata, both of Nara-ken, Japan

[73] Assignee: Matsushita Electric Industrial Co., Ltd., Osaka, Japan

[21] Appl. No.: 283,637

[22] Filed: Aug. 1, 1994

[30] Foreign Application Priority Data

Oct. 25, 1993 [JP] Japan .................. 5-266312
Jan. 25, 1994 [JP] Japan .................. 6-006092

[51] Int. Cl.⁶ .................................................. G02B 6/36
[52] U.S. Cl. ................................ 385/93; 385/91; 385/147
[58] Field of Search ........................... 385/88–93, 33–35

[56] References Cited

U.S. PATENT DOCUMENTS

| | | | |
|---|---|---|---|
| 5,073,047 | 12/1991 | Suzuki et al. | 385/93 |
| 5,119,462 | 6/1992 | Marsubara et al. | 385/93 |
| 5,189,716 | 2/1993 | Matsubara et al. | 385/93 |
| 5,333,224 | 7/1994 | Kikuchi | 385/93 |
| 5,347,604 | 9/1994 | Go et al. | 385/93 |

FOREIGN PATENT DOCUMENTS 3-38605  2/1991  Japan .
3-233415 10/1991  Japan .

*Primary Examiner*—John Ngo
*Attorney, Agent, or Firm*—Ratner & Prestia

[57] ABSTRACT

An optical semiconductor module for holding an optical fiber inserted in a ferrule and for coupling light into the optical fiber, including: a semiconductor light-emitting device; a lens for converging light emitted from the semiconductor light-emitting device; a holder having a cylindrical part for holding the semiconductor light-emitting device and the lens therein and for allowing the adjustment of a position where the semiconductor light-emitting device is to be fixed and thereby enabling the spacing between the semiconductor light-emitting device and the lens to be adjusted, the lens being fixed inside the cylindrical part and the semiconductor light-emitting device also fixed inside the cylindrical part with the optical axis thereof aligned with the lens; and a receptacle having an inner cylinder for holding the ferrule therein, and joined to one end of the holder by butting end to end so as to allow the joining ends to be adjusted in directions perpendicular to the optical axis of the lens so that the light converged by the lens is focused on a light receiving end of the optical fiber.

6 Claims, 12 Drawing Sheets

OPTICAL SEMICONDUCTOR MODULE AND METHOD OF FABRICATING THE SAME

BACKGROUND OF THE INVENTION

1. Field of the Invention

The present invention relates to an optical semiconductor module used in fiber optic communications to converge light emitted from a semiconductor light-emitting device and couple it into an optical fiber.

2. Description of the Related Art

Improvement in light coupling efficiency, simplification in construction, and uniformity in axial length are becoming important considerations in designing optical semiconductor modules used in fiber-optic communications so as to converge light emitted from a semiconductor light-emitting device and couple it into an optical fiber.

In a known optical semiconductor module, a semiconductor light-emitting device containing a laser diode is assembled in a cap-like holder together with a rod-like lens, and a ferrule in which an optical fiber is mounted is inserted in a receptacle. The receptacle and holder are connected together by a cylindrical ring so that the light emitted from the semiconductor light-emitting device is focused onto the light receiving end of the optical fiber.

An optical semiconductor module having such a construction is fabricated in the following manner. First, a semiconductor light-emitting device and a lens are inserted into a holder which in turn is inserted into a ring. Then, a ferrule in which an optical fiber is mounted is inserted into a receptacle. After the holder, ring, and receptacle are assembled together, the holder and ring are moved axially relative to each other for positional alignment before the joint between them is welded by laser. Similarly, the ring and receptacle are moved relative to each other along their adjoining faces and then welded together by laser. Such an optical semiconductor module is disclosed, for example, in Japanese Laid-Open Patent Publication No. 3-233415.

In the known optical semiconductor module, as described above, three parts, i.e., the holder, ring, and receptacle, are needed to hold the semiconductor light-emitting device, lens, and optical fiber in place. Furthermore, the relative position between the semiconductor light-emitting device and the lens are determined permanently once they have been assembled into the holder. It has therefore been necessary to adjust the distance between the receptacle and the holder by adjusting the joining position between the holder and the ring so that the light emitted from the semiconductor light-emitting device can be focused onto the light receiving end of the optical fiber. Since the overall axial length of the module has to be varied, this has presented a problem as it causes variations in the outer dimensions of the module.

SUMMARY OF THE INVENTION

An optical semiconductor module according to the present invention for holding an optical fiber inserted in a ferrule and for coupling light into the optical fiber, includes: a semiconductor light-emitting device; a lens for converging light emitted from the semiconductor light-emitting device; a holder having a cylindrical part for holding the semiconductor light-emitting device and the lens therein and for allowing the adjustment of a position where the semiconductor light-emitting device is to be fixed and thereby enabling the spacing between the semiconductor light-emitting device and the lens to be adjusted, the lens being fixed inside the cylindrical part and the semiconductor light-emitting device also fixed inside the cylindrical part with the optical axis thereof aligned with the lens; and a receptacle having an inner cylinder for holding the ferrule therein, and joined to one end of the holder by butting end to end so as to allow the joining ends to be adjusted in directions perpendicular to the optical axis of the lens so that the light converged by the lens is focused on a light receiving end of the optical fiber.

According to another aspect of the invention, an optical semiconductor module for holding an optical fiber inserted into a ferrule and for coupling light into the optical fiber is provided. The optical semiconductor module includes: a semiconductor light-emitting device; a ring inside of which the semiconductor light-emitting device is held in a fixed position; a lens for converging light emitted from the semiconductor light-emitting device; a holder having a cylindrical hole with the lens fitted in one end thereof and a protrusion formed around the circumference of the other end of the hole, the holder being fixed to the ring after being inserted partway therethrough thereby adjusting the spacing between the lens and the semiconductor light-emitting device; and a receptacle having an inner cylinder for holding the ferrule therein and a recessed portion for holding the protrusion of the holder, and joined to one end of the holder by butting end to end so as to allow the joining ends to be adjusted in directions perpendicular to the optical axis of the lens so that the light converged by the lens is focused on a light receiving end of the optical fiber.

In one embodiment of the invention, the lens is provided with a spacer around the circumference thereof, the spacer being used to determine the spacing between the lens and the semiconductor light-emitting device.

In another embodiment of the invention, the receptacle has, at one end thereof, a tapered portion formed in the shape of a cone with the end to be joined to the holder as the base thereof.

In still another embodiment of the invention, the holder and the receptacle are formed from a ferritic stainless steel containing a maximum of 0.05% sulphur.

In still another embodiment of the invention, the interior of the inner cylinder of the receptacle is made of a ceramic material.

In still another embodiment of the invention, the optical axis of the light converged by the lens intersects the center axis of the receptacle.

In still another embodiment of the invention, the inner cylinder of the receptacle reaches all the way to the recessed portion so that the ferrule is in contact with the protrusion of the holder.

In still another embodiment of the invention, the receptacle has, at one end thereof, a tapered portion formed in the shape of a cone with the end to be joined to the holder as the base.

According to still another aspect of the invention, an optical semiconductor module for holding an optical fiber inserted in a ferrule and for coupling light into the optical fiber is provided. The optical semiconductor module includes: a semiconductor light-emitting device having a light guide and an optical semiconductor chip; a lens for converging light emitted from the semiconductor light-emitting device; a cylindrically shaped holder in which the lens is held in a fixed position; and a receptacle having an inner cylinder for holding the ferrule therein, and joined to one end of the holder by butting end to end so as to allow the joining ends to be adjusted in directions perpendicular to the optical axis of the lens so that the light converged by the lens is focused on a light receiving end of the optical fiber.

In one embodiment of the invention, the light guide includes a disc having anti-reflective films on two principal faces thereof and a reflective film on a side face thereof.

According to still another aspect of invention, a method of fabricating an optical semiconductor module for holding an optical fiber inserted into a ferrule and for coupling light into the optical fiber is provided. The method includes the steps of: fixing a converging lens into a cylindrically shaped holder; inserting a semiconductor light-emitting device in the holder; inserting a ferrule with an optical fiber inserted therein into an inner cylinder for holding the ferrule herein, and butting the receptacle against the holder; and after adjusting the spacing between the semiconductor light-emitting device and the converging lens so that light emitted from the semiconductor light-emitting device is converged by the converging lens onto the light receiving end of the optical fiber, fixing the semiconductor light-emitting device to the holder, moving the holder and the receptacle relative to each other in directions perpendicular to the optical axis of the converging lens, and then fixing the holder to the receptacle.

In one embodiment of the invention, the converging lens is provided with a spacer for determining the spacing between the semiconductor light-emitting device and the converging lens, and the spacing between the semiconductor light-emitting device and the converging lens is adjusted by butting the semiconductor light-emitting device against the spacer.

According to the construction of the invention, the semiconductor light-emitting device is axially moved relative to the lens so as to adjust the distance between them, and the alignment of the holder to the receptacle is adjusted at an abutting joint. This achieves an optical connection with high coupling efficiency between the semiconductor light-emitting device and the optical fiber.

Since the module is included of two or three housing components each of which is so shaped as to be easy to work on, the module can be constructed at low cost.

Furthermore, since a protrusion is provided on one end of an inner cylinder of the holder, dust generated by welding when joining the receptacle and holder can be prevented from entering the light passage hole, thus eliminating the possibility of dust adhering to optical components inside the holder.

Moreover, when ferritic stainless steel is used as the material for the housing components, housing components having excellent stability at high temperature can be fabricated with good workability.

Thus, the invention described herein makes possible the advantages of providing an optical semiconductor module that permits a reduction in the number of component parts as well as a reduction in the variation of the overall axial length of the module, and that provides an optical path for achieving highly efficient optical coupling between a semiconductor light-emitting device and an optical fiber.

These and other advantages of the present invention will become apparent to those skilled in the art upon reading and understanding the following detailed description with reference to the accompanying figures.

DESCRIPTION OF THE PREFERRED EMBODIMENTS

Figure 1:
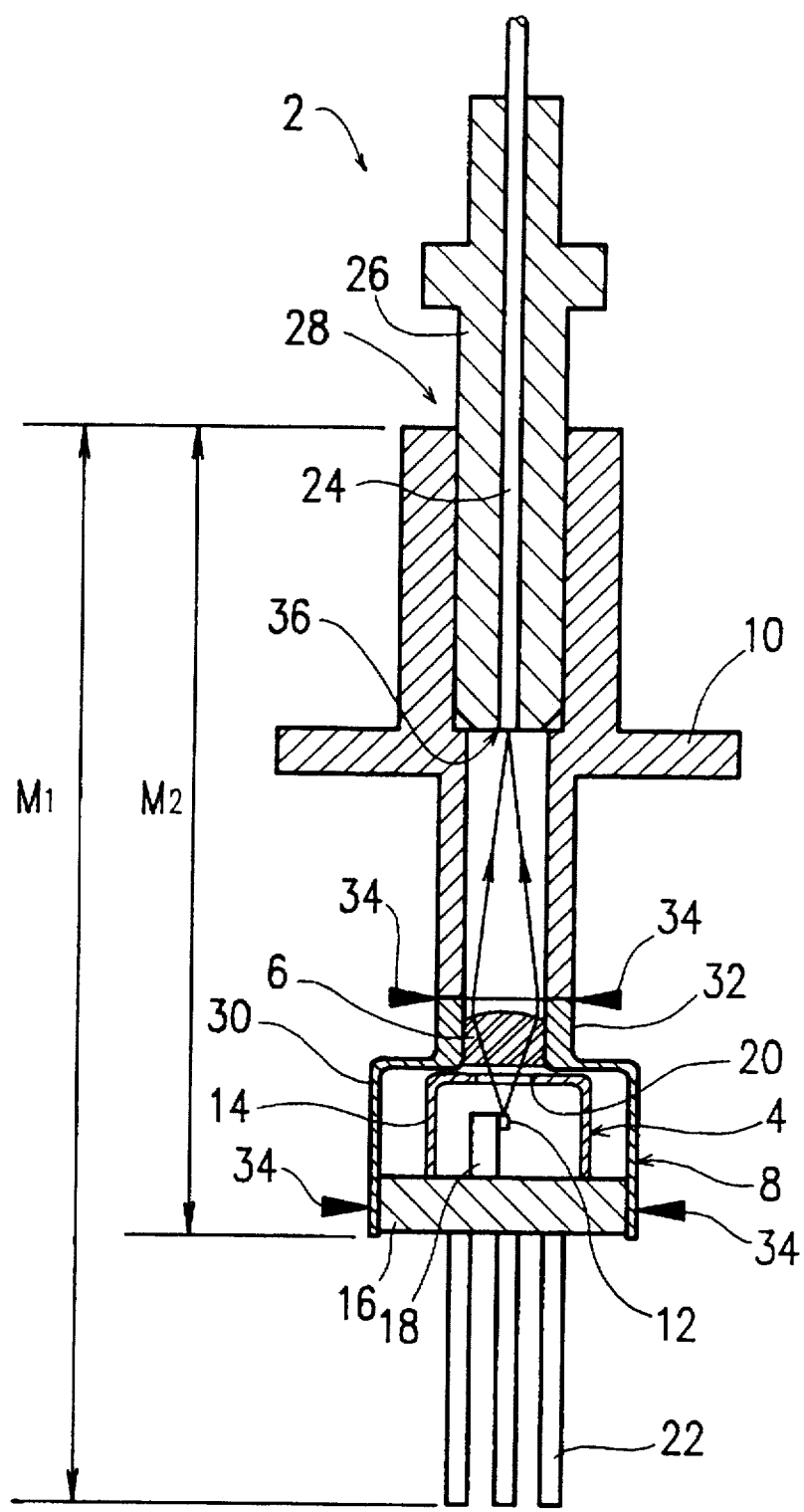
FIG. 1 is a cross-sectional view of an optical semiconductor module according to a first embodiment.

Hereinafter, the present invention will be described by way of examples.

The preferred embodiments of the present invention will now be described below with reference to the accompanying drawings, wherein the same reference numerals designate the same component parts throughout the embodiments described hereinafter.

(Embodiment 1)

FIG. 1 shows a cross section of an optical semiconductor module 2 according to a first embodiment. The optical semiconductor module 2 includes a semiconductor light-emitting device 4, a lens 6, a holder 8, and a receptacle 10.

The semiconductor light-emitting device 4 includes a laser diode 12, a protective cap 14, and a stem 16, the laser diode 12 being secured to a mount 18 fixed to the disc-shaped stem 16. The protective cap 14 shrouding the laser diode 12 is also fixed to the stem 16. Light emitted from the laser diode 12 goes out through a glass window 20 provided in the protective cap 14. The stem 16 and mount 18 are both made of a ferrous metal whose surface is coated with a gold-plated layer. Terminal pins 22 are connected to the laser diode 12. A submount (not shown) or the like made of silicon may be interposed between the laser diode 12 and the mount 18.

The lens 6 is an aspheric glass lens of NA=0.5, coated with an anti-reflective film.

The receptacle 10 includes an inner cylinder 28 that holds therein a ferrule 26 in which a glass fiber 24 is mounted.

The holder 8 includes a cap 30 whose interior space is large enough to accommodate at least the protective cap 14 and stem 16, and a short cylinder 32 formed integrally with the top of the cap 30. The lens 6 is fitted in the short cylinder 32, while the semiconductor light-emitting device 4 is mounted inside the cap 30. The cap 30 of the holder 8 has an inner diameter that is slightly larger than the outer diameter of the stem 16 so that in fabrication, the stem 16 can be smoothly moved inside the holder 8 to adjust the spacing between the lens 6 and the semiconductor light-emitting device 4. The stem 16 and the cap 30 of the holder 8 are welded together by laser at a position indicated at 34. The short cylinder 32 has a wall thickness of about 2 mm, and its smooth outer end face is butt-welded by laser to one end of the receptacle 10 at a position indicated at 34.

Referring to FIGS. 2 through 6, a method for adjusting the positions of the semiconductor light-emitting device 4, the lens 6, and an end face 36 of the optical fiber 24 will be described.

Figure 2:
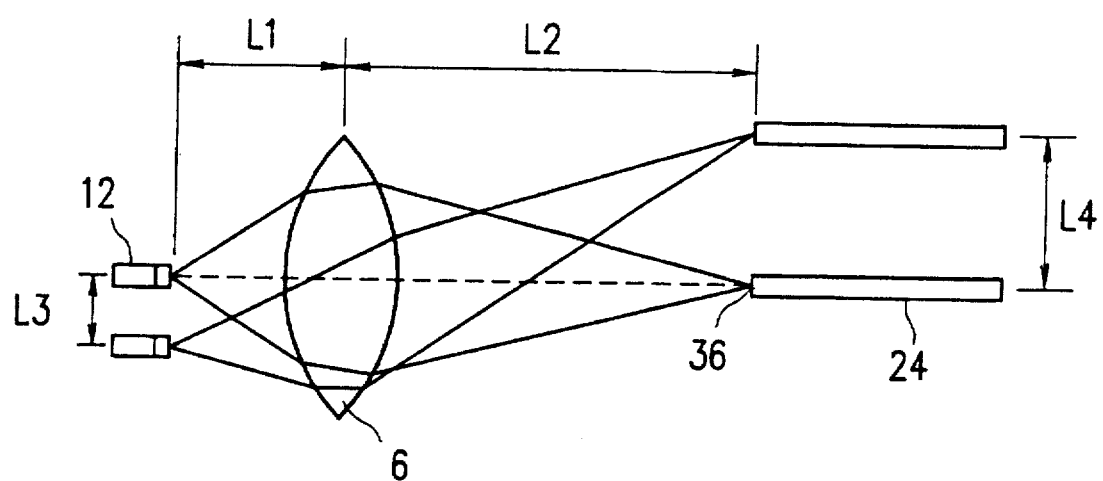
FIG. 2 is a schematic diagram for explaining a light path in the optical semiconductor module.

As is shown in FIG. 2, the distance from the laser chip 12 of the semiconductor light-emitting device 4 to the lens 6 and the distance from the lens 6 to the optical fiber 24 are designated L1 and L2, respectively, and the axial misalignments of the laser chip 12 and the optical fiber 24 with respect to the optical axis of the lens 6 are designated L3 and L4, respectively.

FIGS. 3 through 6 show the optical coupling efficiency for the semiconductor light-emitting device 4 and the optical fiber 24, plotted as a function of L1 to L4, respectively. In making these measurements, a multimode fiber having a core diameter of 50 μm was used as the optical fiber 24.

Figure 3:
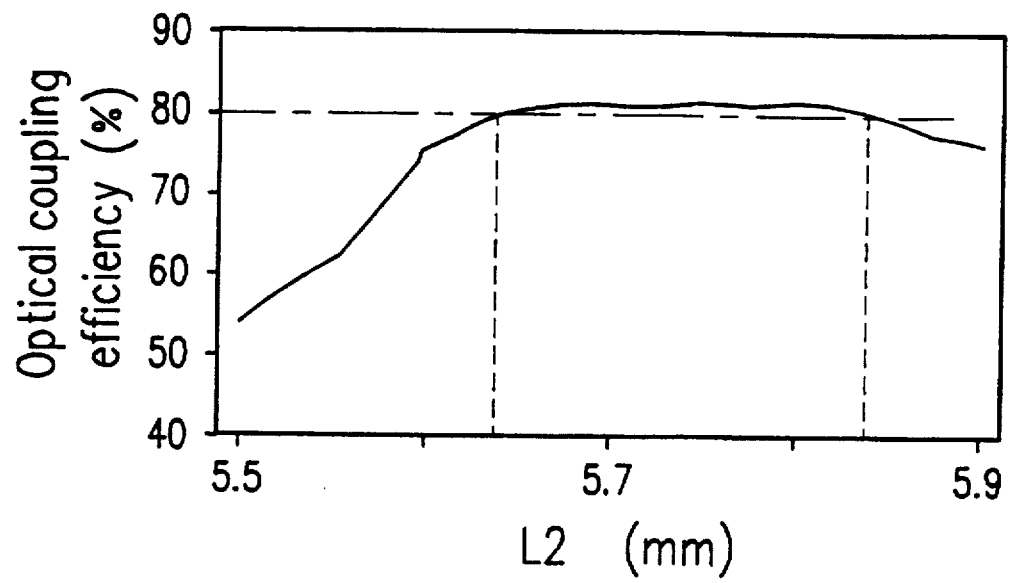
FIG. 3 is a graph plotting optical coupling efficiency as a function of the optical fiber to lens spacing.
Figure 4:
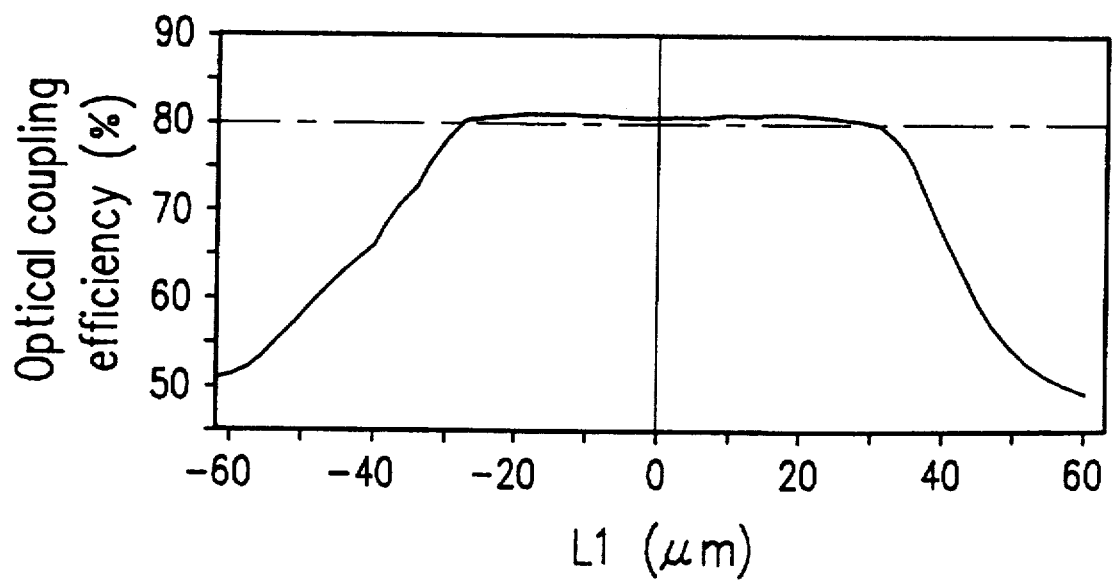
FIG. 4 is a graph plotting optical coupling efficiency as a function of the laser diode to lens spacing.

As can be seen from FIGS. 3 and 4, the allowable range for 80% or more optical coupling efficiency is about 200 μm (about 5.64 to 5.84 mm) for L2, while the comparable range is only about 60 μm (±about 30 μm) for L1. This means that when the optical semiconductor module 2 is fabricated with L2 adjusted for 80% or more coupling efficiency, the overall length of the optical semiconductor module 2 varies within a range of ±about 100 μm. On the other hand, when L1 is adjusted for 80% or more coupling efficiency, the variation in the overall length will fall within a range of ±about 30 μm. It is therefore shown that when the optical semiconductor module 2 is fabricated with L1 adjusted, the variation of the overall length M1 shown in FIG. 1 can be reduced. After adjusting L1, the components need to be fixed in position by YAG laser welding, which may cause positional displacements of ±about 5 μm. These displacements due to welding are sufficiently smaller than the allowable range for L1. Therefore, if L1 is displaced from the adjusted position as a result of welding, L1 will stay well inside the allowable range for L1 so that 80% or more optical coupling efficiency can still be obtained. Furthermore, since the stem 16 and cap 14 of the semiconductor light-emitting device 4 are housed completely inside the cap 30 of the holder 8, the length M2 of the optical semiconductor module 2, excluding the terminal pins 22 of the semiconductor light-emitting device 4, remains unchanged regardless of the above adjustment.

Figure 5:
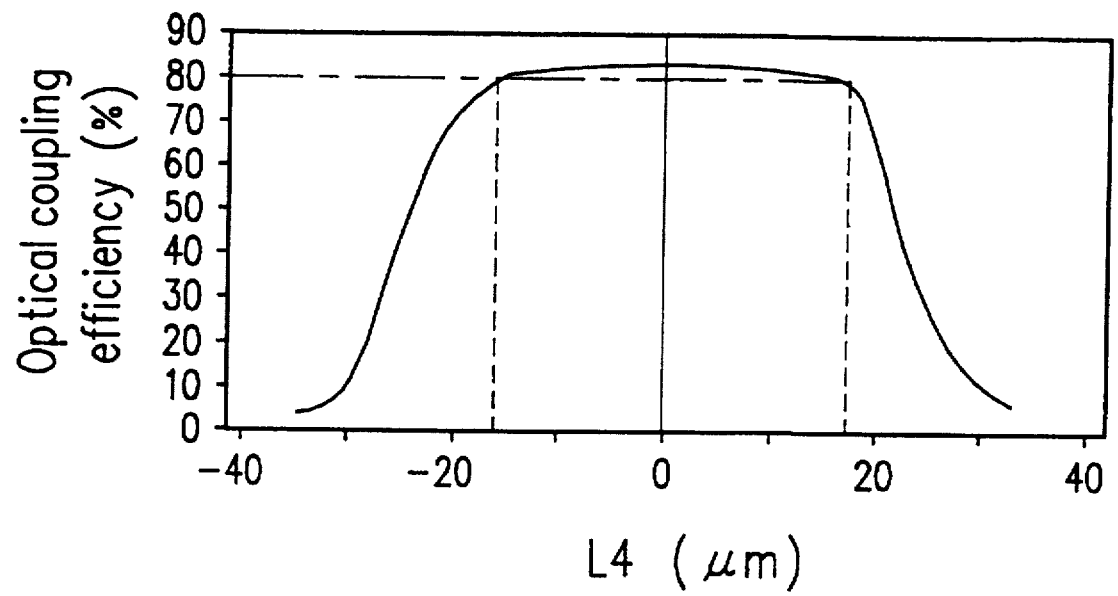
FIG. 5 is a graph plotting optical coupling efficiency as a function of the amount of axial misalignment of the optical fiber.
Figure 6:
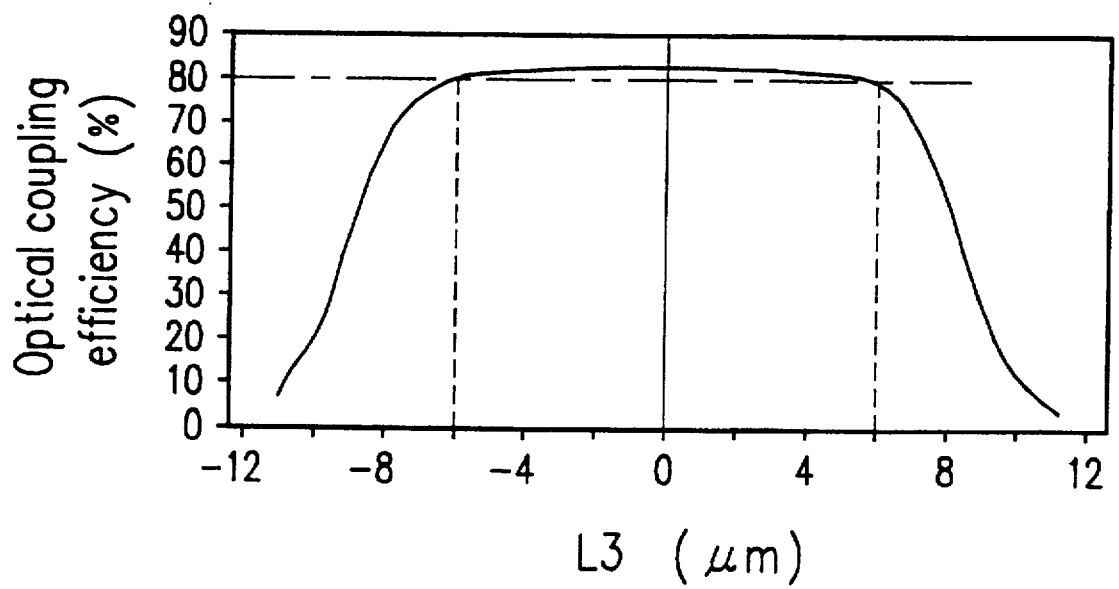
FIG. 6 is a graph plotting optical coupling efficiency as a function of the amount of axial misalignment of the laser diode.

Next, we will consider how positional displacements in directions perpendicular to the optical axis of the lens (axial misalignments) affect the optical coupling efficiency. FIGS. 5 and 6 show that the allowable range for 80% or more optical coupling efficiency is about 12 μm (±6 μm) for L3 and about 34 μm (±17 μm) for L4, respectively. Considering the fact that positional displacements of ±about 5 μm are introduced as a result of welding, as described above, the allowable range for L3 is not sufficiently large compared with the positional displacements caused by welding. Therefore, it is preferable that the optical semiconductor module 2 be fabricated by adjusting L4.

To accomplish the above light path adjustment in the optical semiconductor module 2 shown in FIG. 1, the spacing between the semiconductor light-emitting device 4 and the lens 6 is adjusted inside the holder 8 to adjust L1, and the alignment of the holder 8 to the receptacle 10 is adjusted at their abutting ends to adjust L4. A fabrication process for the optical semiconductor module 2 will be described in detail below.

Referring to FIG. 1, the lens 6 is first inserted in the short cylinder 32 of the holder 8 and fixed in place, while the semiconductor light-emitting device 4 is inserted in the cap 30 of the holder 8. The ferrule 26 with the optical fiber 24 mounted therein is fitted in advance into the inner cylinder 28 of the receptacle 10. Next, the short cylinder 32 and the receptacle 10 are held in position with their end faces abutting against each other. The semiconductor light-emitting device 4 is driven so as to emit light. While measuring the intensity of the light entering the optical fiber 24, first the position of the stem 16 of the semiconductor light-emitting device 4 is adjusted within the cap 30, and the holder 8 and the stem 16 are welded together at the position 34 by YAG laser. Then, the holder 8 is moved relative to the receptacle 10 at their abutting faces in directions perpendicular to the optical axis to adjust the alignment. After the adjustment is complete, the holder 8 and the receptacle 10 are welded together at position 34.

According to this embodiment, the variation of the overall length of the optical semiconductor module 2 can be reduced without decreasing the fabrication yield. Furthermore, since the module can be constructed from two housing components, the fabrication process is simplified, the light path adjustment is made easy, and optical semiconductor modules with high optical coupling efficiency can be obtained.

(Embodiment 2)

Figure 7:
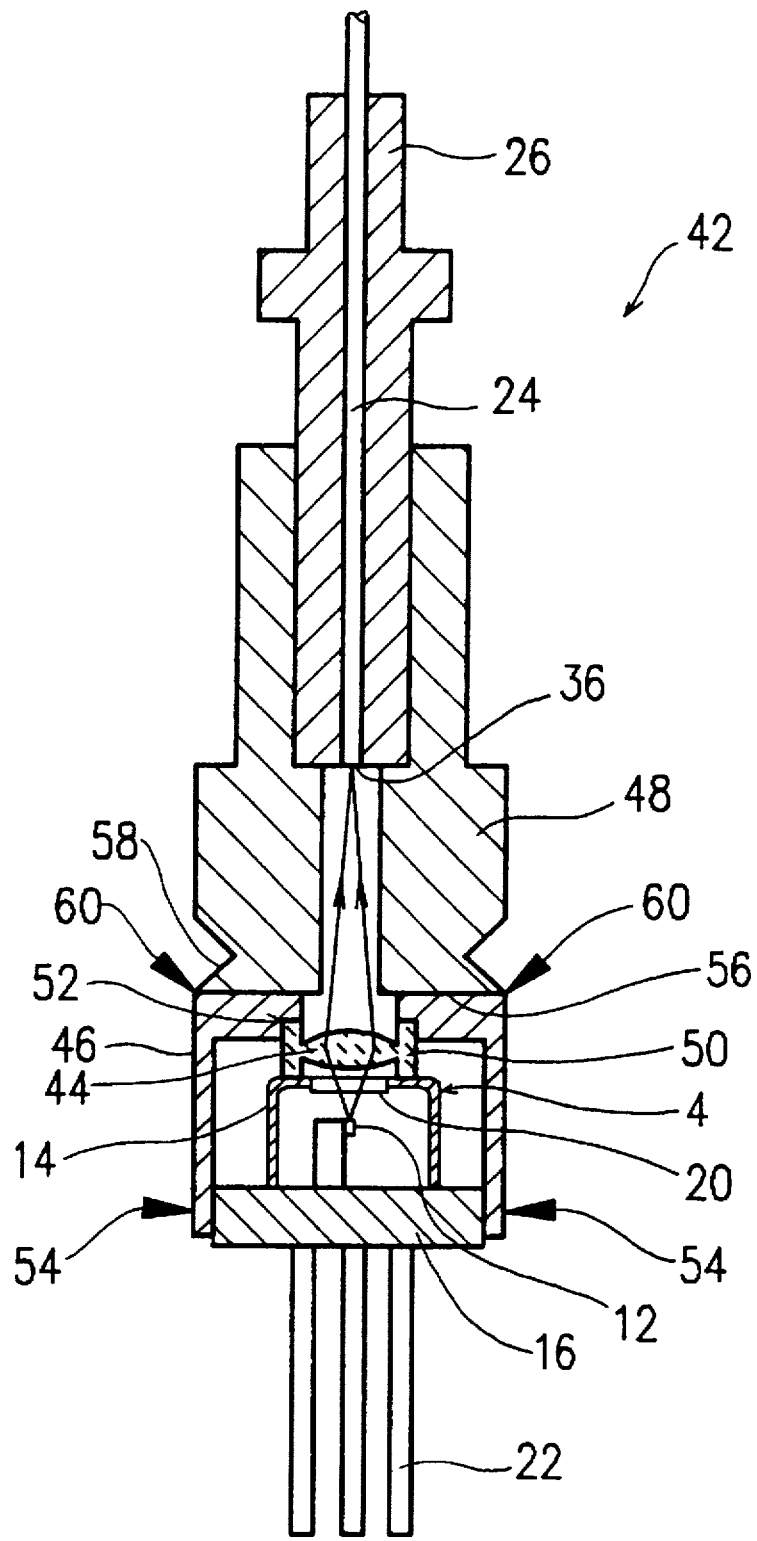
FIG. 7 is a cross-sectional view of an optical semiconductor module according to a second embodiment.

FIG. 7 shows a cross section of an optical semiconductor module 42 according to a second embodiment of the invention. To make it easier to distinguish the feature of this embodiment, the same component elements as those of the optical semiconductor module 2 of Embodiment 1 are designated by the same reference numerals, so explanation of such elements is not repeated here. The optical semiconductor module 42 includes a semiconductor light-emitting device 4, a lens 44, a holder 46, and a receptacle 48.

The lens 44 is made of plastic and has a cylindrical part 50 integrally formed around the circumferential edge thereof. The cylindrical part 50 is sandwiched and held in position between a recess 52 formed in the ceiling of the holder 46 and the protective cap 14 of the semiconductor light-emitting device 4. The cylindrical part 50 serves as a spacer to determine the spacing between the lens 44 and the semiconductor light-emitting device 4, the height thereof being adjusted so that the light emitted from the semiconductor light-emitting device 4 is focused through the lens 44 onto the light receiving end of the optical fiber 24.

More specifically, first the lens 44 having the cylindrical part 50 of an appropriate height is prepared. Then, employing the method described in Embodiment 1, the position of the optical semiconductor module 42 is adjusted by incrementally cutting the cylindrical part 50 until the desired spacing is obtained between the semiconductor light-emitting device 4 and the lens 44. After that, the stem 16 and holder 46 are welded together at position 54 while pressing the semiconductor light-emitting device 4 against the cylindrical part 50. With this method, since the semiconductor light-emitting device 4 is held in a fixed position relative to the holder 46 via the cylindrical part 50 during welding, the possibility of positional displacement during welding is greatly reduced.

The above construction also provides the following advantages. Good axial alignment can be obtained between the lens 44 and the holder 46 since the upper end of the cylindrical part 50 is held in place by the recess 52 formed in the ceiling of the holder 46. Thus, the lens 44 can be easily fixed in position and yet the lens body is not directly subjected to stress.

The receptacle 48 and the holder 46 are joined together in a similar manner to that described in Embodiment 1. The receptacle 48 is provided with a taper 58 formed in the shape of a cone whose base forms an abutting face 56 that contacts the holder 46. Therefore, when welded by laser at position 60 from oblique directions, as shown in FIG. 7, the receptacle 48 and the holder 46 can be joined together firmly and quickly with very little degradation in mechanical strength.

(Embodiment 3)

Figure 8:
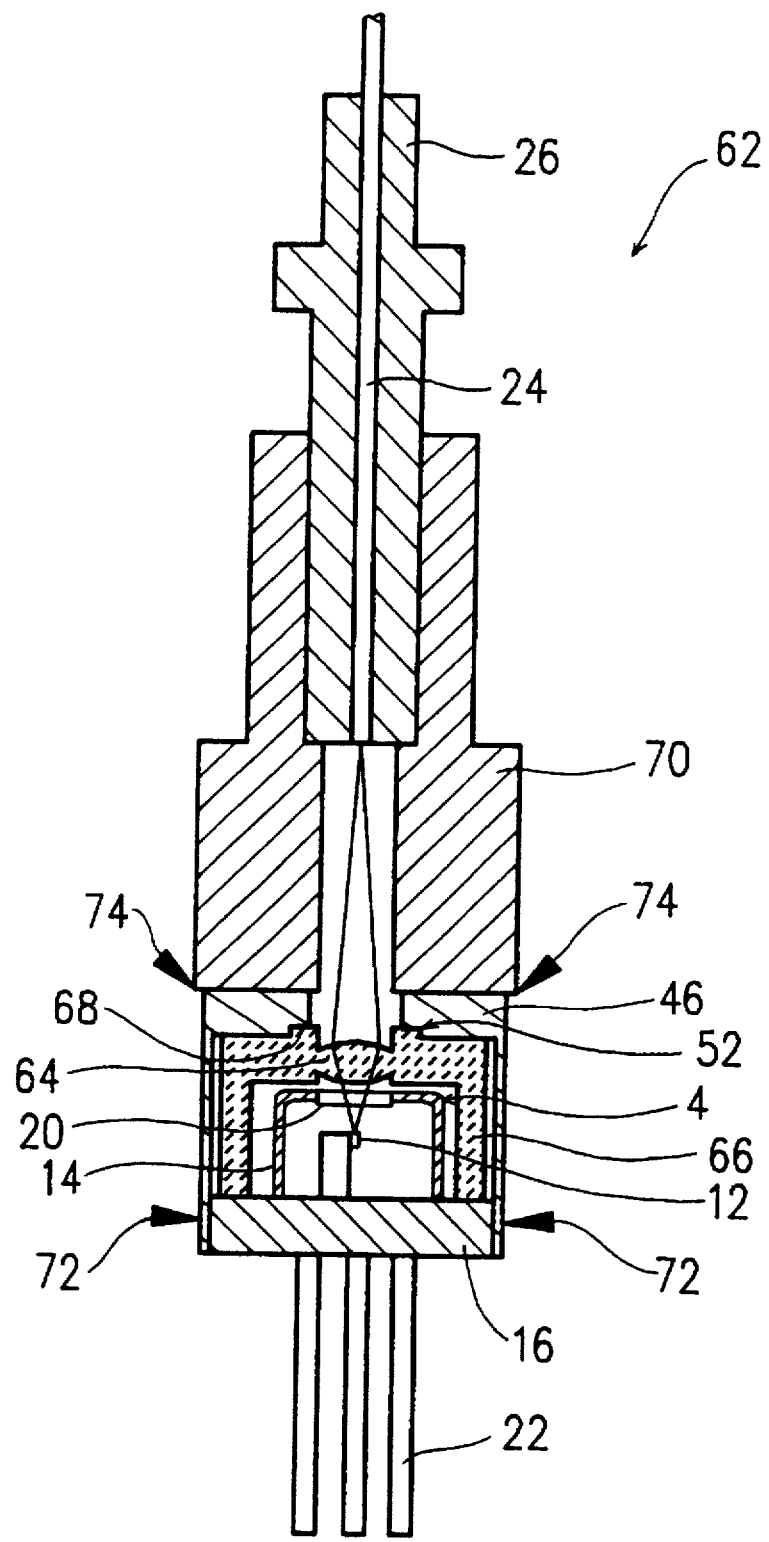
FIG. 8 is a cross-sectional view of an optical semiconductor module according to a third embodiment.

FIG. 8 shows a cross section of an optical semiconductor module 62 according to a third embodiment. To make it easier to distinguish the feature of this embodiment, the same component elements as those of the optical semiconductor module 42 of Embodiment 2 are designated by the same reference numerals, so explanation of such elements is not repeated herein. In the optical semiconductor module 62, the shape of the lens 64 is different from that in the optical semiconductor module 42 of Embodiment 2.

The lens 64 is made of plastic and has a cylindrical skirt 66 integrally formed around the circumferential edge thereof. The lens 64 is also provided with a protrusion 68 which is held against the recess 52 formed in the ceiling of the holder 46. The lens 64 is sandwiched and held in position between the top of the holder 46 and the stem 16 of the semiconductor light-emitting device 4.

The skirt 66 serves as a spacer to determine the spacing between the semiconductor light-emitting device 4 and the lens 64. The spacing between the semiconductor light-emitting device 4 and the lens 64 is adjusted by reducing the height of the skirt 66, as in Embodiment 2, and the stem 16 and the holder 46 are welded together at position 72. Using the lens 64 of such construction, the spacing between the laser diode 12 and the lens 64 can be adjusted to an optimum value independently of the height of the cap 14 of the semiconductor light-emitting device 4.

After adjusting the alignment in the same manner as described in Embodiment 2, the receptacle 70 and the holder 46 are welded together at position 74.

(Embodiment 4)

Figure 9:
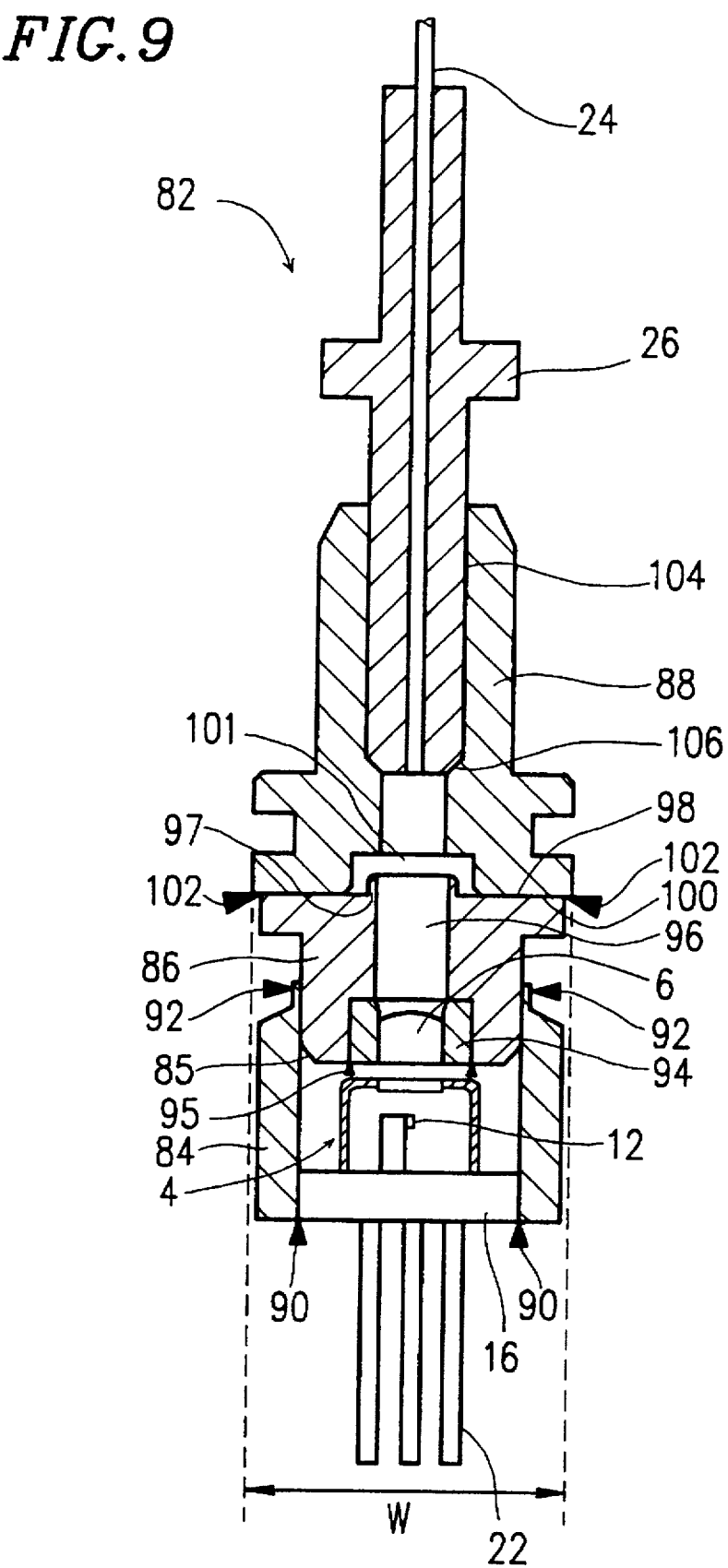
FIG. 9 is a cross-sectional view of an optical semiconductor module according to a fourth embodiment.

FIG. 9 shows a cross section of an optical semiconductor module 82 according to a fourth embodiment of the invention.

The optical semiconductor module 82 includes a semiconductor light-emitting device 4, a ring 84, a lens 6, a holder 86, and a receptacle 88.

The semiconductor light-emitting device 4 is inserted in the ring 84, and the stem 16 and ring 84 are welded together at their junction 90 by YAG laser for enhanced reliability. The ring 84 includes an upper end portion 92 having a narrower wall thickness. More specifically, the upper end portion 92 has a thickness of about 0.2 mm over its full width of about 1 mm.

The lens 6 is an aspheric lens, which is inserted and fixed in place in a cylinder 94 made of a ferrous metal.

The holder 86 is of a cylindrical shape having a hole 96 opened therethrough. With the cylinder 94 welded to the holder 86 at position 95, the lens 6 inserted in the cylinder 94 is fixed in position in one end of the hole 96. A protrusion 97 is provided at the other end of the hole 96 in an encircling relationship thereto. A portion of the holder 86 is inserted into the ring 84.

The lower end portion of the holder 86 (at the end where the lens 6 is inserted) is provided with a taper 85 of about 0.5 mm so as to make it easy to insert the holder 86 into the ring 84. Furthermore, the holder 86 has a smooth outer circumferential surface to allow the ring 84 to slide smoothly. The holder 86 is fixed to the upper end portion 92 of the ring 84 by welding. Since the ring 84 is differently shaped at its upper end portion 92 than at other portions, it is easy to position the YAG laser beam when welding the desired position. Furthermore, the thin wall thickness of the upper end portion 92 makes it easier for the heat from the laser beam to transmit to the holder 86, and thus provide a reliable welding between the ring 84 and the holder 86.

The face 98 of the holder 86 which contacts the receptacle 88 is finished with a high degree of surface flatness so that the holder 86 can be moved smoothly in its contact relationship with the receptacle 88.

On the other hand, the receptacle 88 has a face 100 that contacts the face 98. The face 100 has a larger area than the face 98, and, like the face 98, is finished with a high degree of surface flatness. The face 100 is provided around its center with a recess 101 which holds the protrusion 97. The receptacle 88 and holder 86 are joined together with the face 100 welded by YAG laser to a rim 102 of the holder 86.

The receptacle 88 has a hole 104 into which the ferrule 26 is inserted. The ferrule 26 has a tapered tip so that the ferrule 26 can be easily inserted into the hole 104. The tip of the ferrule 26 has a minimum diameter of 1.75 mm. One end of the hole 104 is formed with a taper 106 providing a minimum hole diameter of about 1.75 mm to match the tapered tip of the ferrule 26. When the ferrule 26 is inserted through the hole 104 of the receptacle 88, the tip of the ferrule 26 is stopped where the taper 106 of the hole 104 provides the smallest hole diameter, thus positioning the center axis of the ferrule 26 in alignment with that of the hole 104. Since the ferrule 26 is mounted with the optical fiber 24 inserted through its center, the center axes of the optical fiber 24 and the hole 104 are also aligned. Since the alignment of the hole 104 to the ferrule 26 is determined by the taper 106, the hole 104 does not require a high degree of processing accuracy. A tolerance of about 10 μm is allowable.

The optical semiconductor module 82 is fabricated in the following sequence.

First, the semiconductor light-emitting device 4 is inserted into the ring 84, and the semiconductor light-emitting device 4 and ring 84 are welded together at position 90. In the meantime, the lens 6 is inserted into the cylinder 94, after which the cylinder 94 is welded to the holder 86 at position 95. The ferrule 26 is inserted in advance in the receptacle 88.

With the ring 84, holder 86, and receptacle 88 held in position as shown in FIG. 9, the laser diode 12 in the semiconductor light-emitting device 4 is driven to emit light, and the optical axis is adjusted while monitoring the intensity of the light entering the optical fiber 24.

The ring 84 is axially moved relative to the holder 86 so as to adjust the position (the tolerance of displacement is about 80 μm). After the adjustment is complete, the ring 84 is welded at its upper end portion 92 by YAG laser. On the other hand, axial alignment is adjusted at the abutting joint between the holder 86 and the receptacle 88 (face 98 and face 100) (the tolerance of misalignment is about 34 μm).

After the adjustment is complete, the rim 102 of the holder 86 is welded to the face 98 by YAG laser. The YAG laser light is directed at an angle to the abutting joint for enhanced joining strength. Although positional displacements of ±about 5 µm are caused by welding, any of these displacements falls within the tolerance; thus, optical semiconductor modules can be manufactured with high yields.

According to the above construction, the variation of the overall length of the optical semiconductor module 82 can be reduced, and modules having high optical coupling efficiency can be fabricated with high yields.

Furthermore, since the alignment of the ferrule 26 to the hole 104 of the receptacle 88 is adjusted at the tapered end 106 of the hole 104, the hole 104 itself does not require a high degree of processing accuracy. This greatly eases parts processing work and therefore reduces the parts cost.

If the laser diode 12 is slightly out of alignment with the center axis of the lens 6, the holder 86 and the receptacle 88 are moved relative to each other in directions perpendicular to the axis so as to achieve optical coupling. In this case, since the face 100 of the receptacle 88 is larger than the face 98 of the holder 86, if they are misaligned in optical adjustment, the entire holder 86 will stay inside the outer diameter of the receptacle 88. As a result, the diametrical dimension W of the optical semiconductor module 82 remains the same regardless of displacement in the joining position between the holder 86 and the receptacle 88. Thus, optical semiconductor modules that meet the required specification can be fabricated with high yields.

When the holder 86 and receptacle 88 are joined together by welding, high-temperature dust fused by YAG laser light is formed at the joint between the faces 98 and 100. This dust is blown in the travelling direction of the YAG laser light and adheres to the protrusion 97. The dust is thus stopped by the protrusion 97 and prevented from entering the interior of the hole 96, so that the surface of the lens 6 can be always kept clean.

Furthermore, the lowermost outer circumference 85 of the holder 86 (at the end where the lens 6 is inserted) is chamfered to 0.5 mm. As a result, the holder 86 can be inserted into the ring 84 quite easily, which greatly facilitates the assembling work.

(Embodiment 5)

Figure 10:
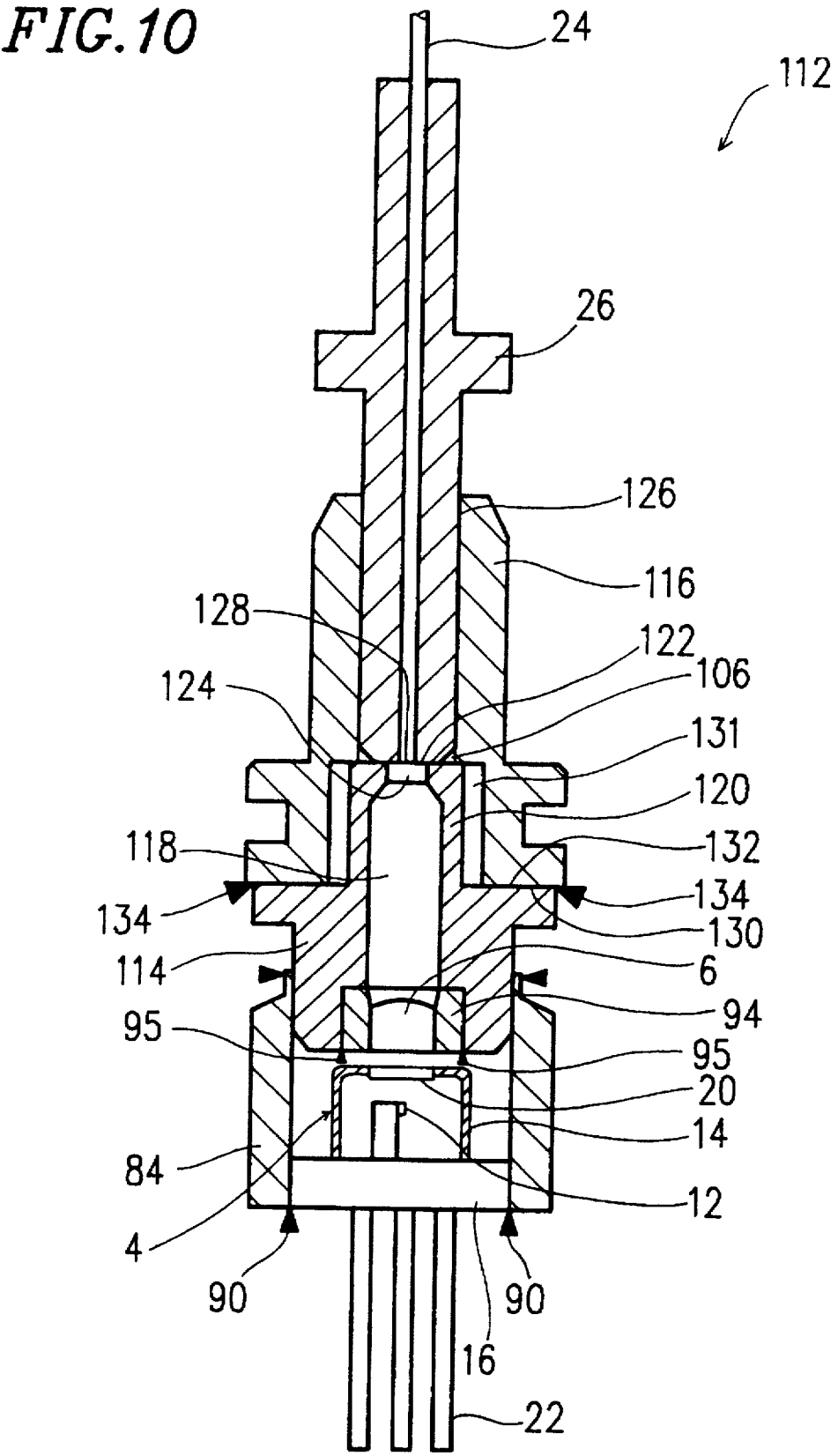
FIG. 10 is a cross-sectional view of an optical semiconductor module according to a fifth embodiment.

FIG. 10 shows a cross section of an optical semiconductor module 112 according to a fifth embodiment of the invention. To make it easier to distinguish the feature of this embodiment, the same component elements as those of the optical semiconductor module 82 of Embodiment 4 are designated by the same reference numerals, so explanation of such elements is not repeated herein. The optical semiconductor module 112 includes a semiconductor light-emitting device 4, a lens 6, a ring 84, a holder 114, and a receptacle 116.

The holder 114 is of a cylindrical shape having a hole 118 opened therethrough, and the lens 6 inserted in the cylinder 94 is held in position in one end of a hole 118. A protrusion 120 is provided at the other end of the hole 118 in an encircling relationship thereto. The upper end of the protrusion 120 forms an end face 122 having an opening 124 therein.

The receptacle 116 has a throughhole 126. The tip 128 of the ferrule 26 inserted from the upper end of the receptacle 116 contacts an end face 122 of the protrusion 120 of the holder 114. The receptacle 116 has a face 130 in which a recess 131 is formed for holding the protrusion 120 of the holder 114. The face 130 of the receptacle 116 is made to abut against a face 132 of the holder 114, and a rim 134 of the holder 114 is welded to the face 130.

Since the hole 126 is formed through the receptacle 116, accurate processing is easy compared with a hole having a closed end, and the hole 126 is formed to a tolerance of 3 µm or less. The opening 124 formed in the holder 114 has a diameter of about 1 mm so that the light converged by the lens 6 is delivered to the optical fiber 24 without loss. The hole 118 through which the converged light is passed has a diameter of about 1.7 mm that is equal to the diameter of the lens 6. It is desirable that the opening 124 be made smaller in diameter than the tip 128 of the ferrule 26 so as to ensure stable contact between the tip 128 and the end face 122.

The ring 84, holder 114, and receptacle 116 each demand a certain degree of processing accuracy. In particular, the hole 126 of the receptacle 116 demand a tolerance of 3 µm or less on its hole diameter. Generally, austenitic stainless steel having good cutting and anti-corrosion properties is used for optical semiconductor modules. However, since austenitic stainless steel contains nickel, the nickel may react with sulphur to produce sulphides during fusing by welding, causing cracks in the weld.

In this embodiment, ferritic stainless steel that does not contain nickel is used for the ring 84, holder 114, and receptacle 116. Since ferritic stainless steel does not contain nickel, nickel-based sulphides are not produced during fusing by welding, and no cracks are caused in the weld. Specifically, when a ferritic stainless steel containing a maximum of 0.05% sulphur is used, the cutting property is improved. If the sulphur content is increased, the cutting property will be further improved, but this in turn tends to produce sulphides. It is therefore desirable that the sulphur content be kept to 0.05% at the maximum.

According to the above construction, the distance between the lens 6 and the end of the optical fiber 24 (the tip 128 of the ferrule 26) is determined uniquely by the external shape of the holder 114, and is not dependent on the shape of the receptacle 116. This reduces the variation caused by variations in the parts processing accuracies, and thus improves the fabrication yield while making the optical axis adjustment easier.

When joining the receptacle 116 and holder 114 with the faces 130 and 132 abutting against each other, the dust generated by welding is stopped by the protrusion 120 and prevented from entering the hole 118 that acts the light passage. As a result, there is no possibility of the dust adhering to the surface of the lens 6.

Furthermore, since the holes opened through the components that require accurate processing are simple in construction, it is easy to process the components, which leads to reducing the manufacturing costs of the components.

A fabrication process for the optical semiconductor module 112 will be described below with reference to FIGS. 10, 11A, and 11B.

First, the semiconductor light-emitting device 4 is inserted in the ring 84, and the semiconductor light-emitting device 4 and the ring 84 are joined together by welding at position 90. In the meantime, the lens 6 is inserted into the cylinder 94, after which the cylinder 94 is welded to the holder 114 at position 95. The ferrule 26 is inserted in advance in the receptacle 116.

Figure 11A:
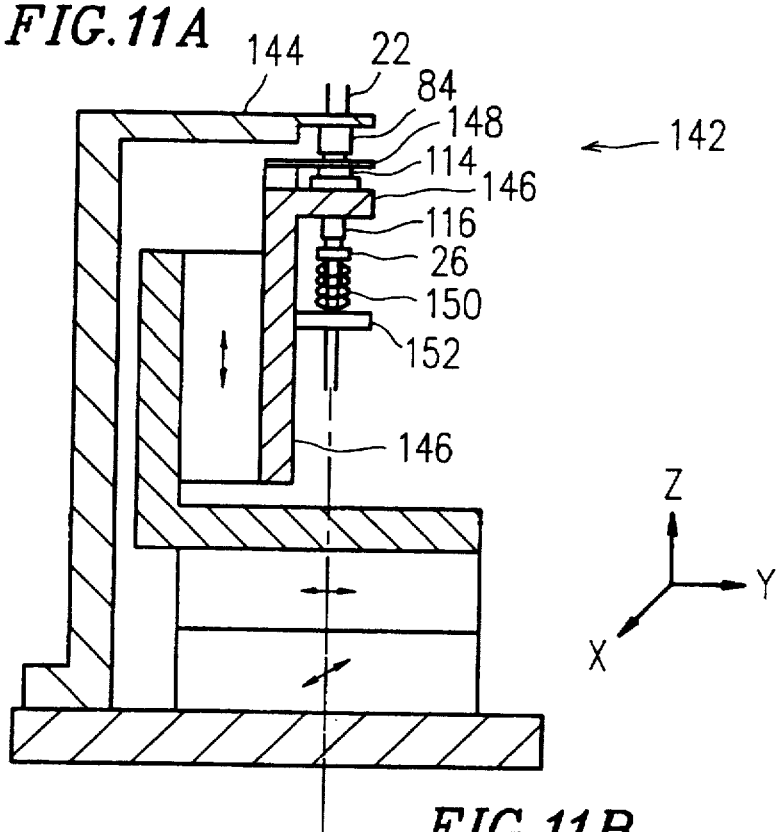
FIG. 11A is a diagram schematically illustrating an assembling method for an optical semiconductor module and a cross section of an assembling apparatus.
Figure 11B:
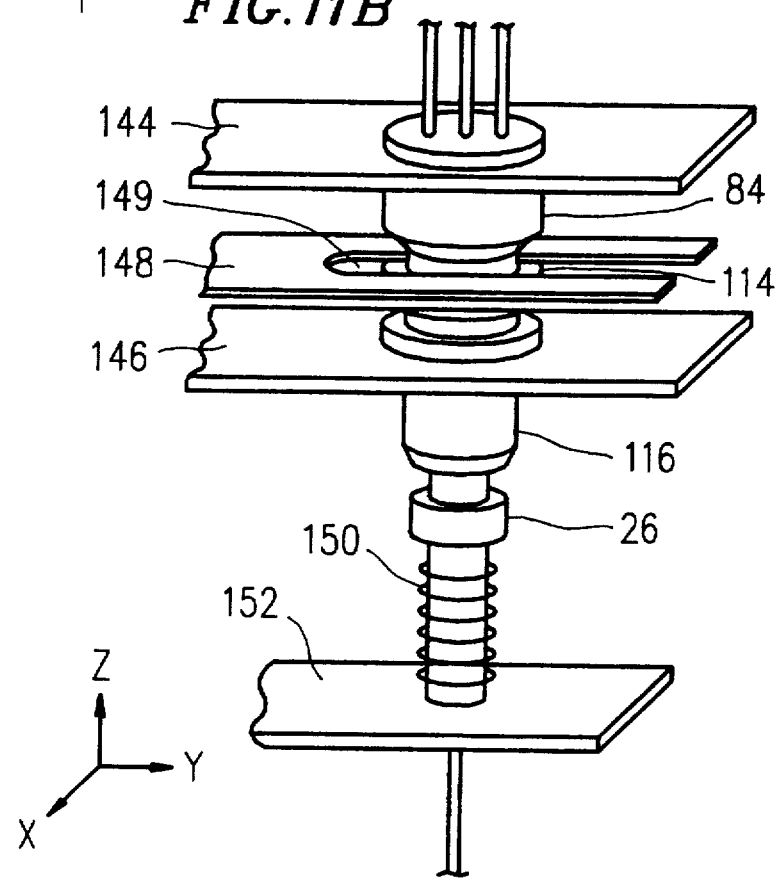
FIG. 11B is an enlarged view of an essential portion of FIG. 11A.

FIG. 11A shows an adjusting jig 142 for assembling the optical semiconductor module 112 of the invention and for adjusting axial alignment. FIG. 11B shows an essential portion of the same. In FIGS 11A and 11B, the ring 84 and receptacle 116 are supported by a metal column 144 and a stage 146, respectively. The stage 146 is movable in X-, Y-, and Z-axis directions. The holder 114 is pressed against the receptacle 116 by a plate spring 148 so that the holder 114 will not come apart from the receptacle 116. The plate spring 148 has a groove 149 whose width is greater than the outer diameter of the holder 114, so that the holder 114 can move in the groove 149 in X and Y directions. Therefore, although the plate spring 148 is fixed to the stage 146, the receptacle 116 which is fixed to the stage 146 can move in X and Y directions independently of its relationship with the holder 114. The ferrule 26 inserted in the receptacle 116 is caused to abut against the holder 114 by using a helical coil 150. One end of the helical coil 150 is fixed by a stopper 152.

When the stage 146 is moved in Z direction, the holder 114 easily slips into the ring 84 because the upper end circumference of the holder 114 is chamfered to 0.5 mm. Because the ring 84 is fixed in X, Y, and Z directions the holder 114 inserted in the ring 84 can only move in Z direction. The holder 114 is also pressed in Z direction by the plate spring 148. On the other hand, the receptacle 116 can move in X, Y, and Z directions. This allows axial adjustments by moving the receptacle 116 in X and Y directions with the holder 114 held in the ring 84. The axial adjustment is performed while holding the tip 128 of the ferrule 26 in contact with the end 122 of the holder 114. When the adjustment is complete, the ring 84 and holder 114 are welded together by YAG laser, after which the positions of the holder 114 and receptacle 116 are adjusted in directions perpendicular to the axis and the two components are then welded together.

According to the above method, when the optical axis is being adjusted with the semiconductor light-emitting device 4 emitting light, the heat generated by the semiconductor light-emitting device 4 is dissipated through the metal column 144. Also, since the ferrule 26 is pressed from below by the spring 150, the components can be assembled together while holding the light receiving face of the optical fiber 24 in a fixed position (in contact with the protrusion 120 of the holder 114). Furthermore, since the holder 114 is pressed only in Z direction by using the plate spring 148, the holder 114 always stays in contact with the receptacle 116 while the receptacle 116 is being moved in Z direction. Also, the holder 114 can be moved in Z direction while it is being held in the ring 84. Thus, all portions to be welded are always in contact with each other, and therefore, can be welded together upon the completion of the axial adjustment. This simplifies the assembling work and reduces the assembling time.

(Embodiment 6)

Figure 12:
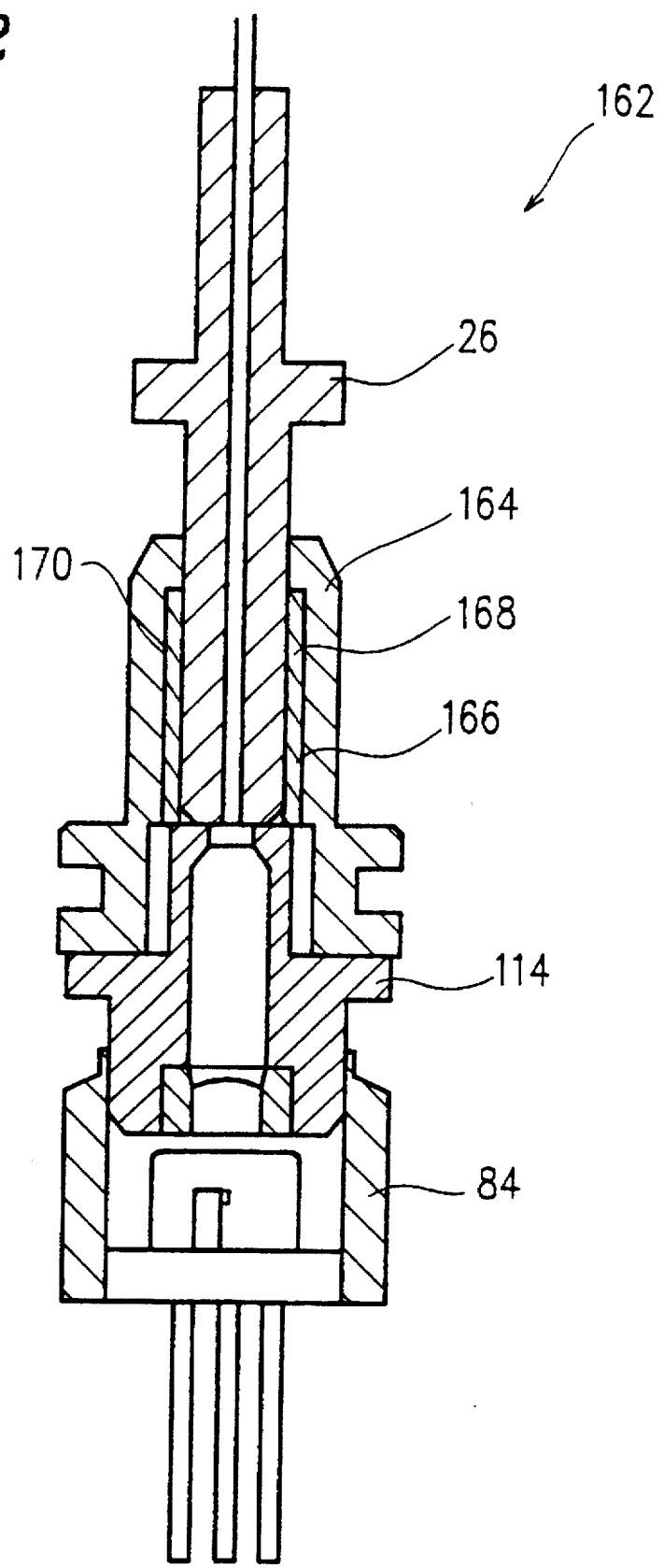
FIG. 12 is a cross-sectional view showing the construction of an optical semiconductor module according to a sixth embodiment.

FIG. 12 shows a cross section of an optical semiconductor module 162 according to a sixth embodiment of the invention. To make it easier to distinguish the feature of this embodiment, the same component elements as those of the optical semiconductor module 112 of Embodiment 5 are designated by the same reference numerals, so explanation of such elements is not repeated here.

The optical semiconductor module 162 differs from the optical semiconductor module 112 of Embodiment 5 in that a ceramic sleeve 166 having a hole 168 is contained in the receptacle 164 in the optical semiconductor module 162. Since ceramic components can be processed with high accuracy, the hole 168 of the sleeve 166 can be made to very close tolerances. On the other hand, a hole 170 in which the sleeve 166 is inserted does not demand as high a processing accuracy as the hole 168. Therefore, for the receptacle 164, the manufacturing cost is considered in preference to processing accuracy. The ring 84 and holder 114 also do not demand high processing accuracy. Therefore, for the making of the ring 84, holder 114, and receptacle 164, a sintering process is employed in which metal powders are shaped and sintered so as to reduce the costs of the components. According to this embodiment, though the number of component parts is increased, the total cost of the components can be reduced. The sleeve 166 has been described as being made of a ceramic material, but it will be appreciated that metals or other materials suitable for precision processing may be used instead of ceramics.

(Embodiment 7)

Figure 13:
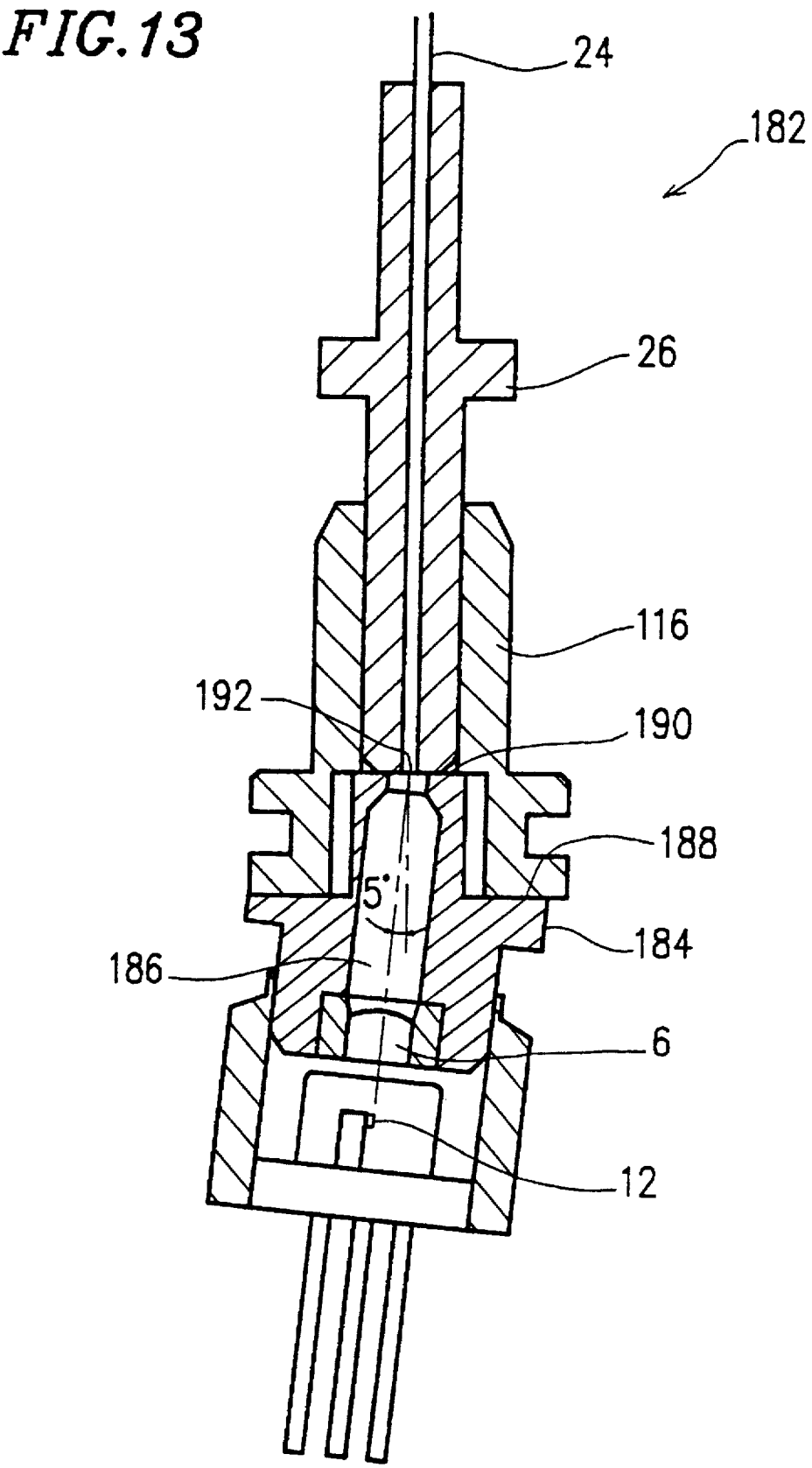
FIG. 13 is a cross-sectional view showing the construction of an optical semiconductor module according to a seventh embodiment.

FIG. 13 shows a cross section of an optical semiconductor module 182 according to a seventh embodiment. To make it easier to distinguish the feature of this embodiment, the same component elements as those of the optical semiconductor module 112 of Embodiment 5 are designated by the same reference numerals, so explanation of such elements is not repeated herein.

The difference from the optical semiconductor module 112 of Embodiment 5 is that in the optical semiconductor module 182, the center axis of the receptacle 116 is not in alignment with the center axis (optical axis) of the lens 6, but angularly displaced by about 5 degrees. To displace the center axis of the ferrule 26 by an angle of about 5 degrees with respect to the center axis of the lens 6, faces 188 and 190 are both tilted at about 5 degrees with respect to the center axis of the hole 186 formed through the holder 184.

If the center axis of the ferrule 26 is in alignment with the center axis of the lens 6, light reflected by the end 192 of the optical fiber 24 will be directed in the backward direction, and passed through the lens 6, to be fed back to the laser diode 12. If the light is thus reflected back into the laser diode 12, the light emitting condition of the laser diode 12 will tend to become unstable. To avoid this, the ferrule 26 is tilted with respect to the optical axis so that the reflected light will be directed obliquely to the optical axis and will not be returned to the laser diode 12. This ensures stable light-emitting operations of the laser diode 12. Such construction is particularly suitable for optical semiconductor modules for analog signals and is effective in improving distortion characteristics.

In this embodiment, the tilt angle is set at 5 degrees, but any tilt angle may be employed as long as it permits coupling of light into the optical fiber 24 and yet suppresses reflection of light from the optical fiber end back into the semiconductor light-emitting device. However, if this angle is made too steep, it will become difficult to deliver light to the optical fiber 24 with high coupling efficiency. A desirable tilt angle is in the range of 3 to 6 degrees.

(Embodiment 8)

Figure 14:
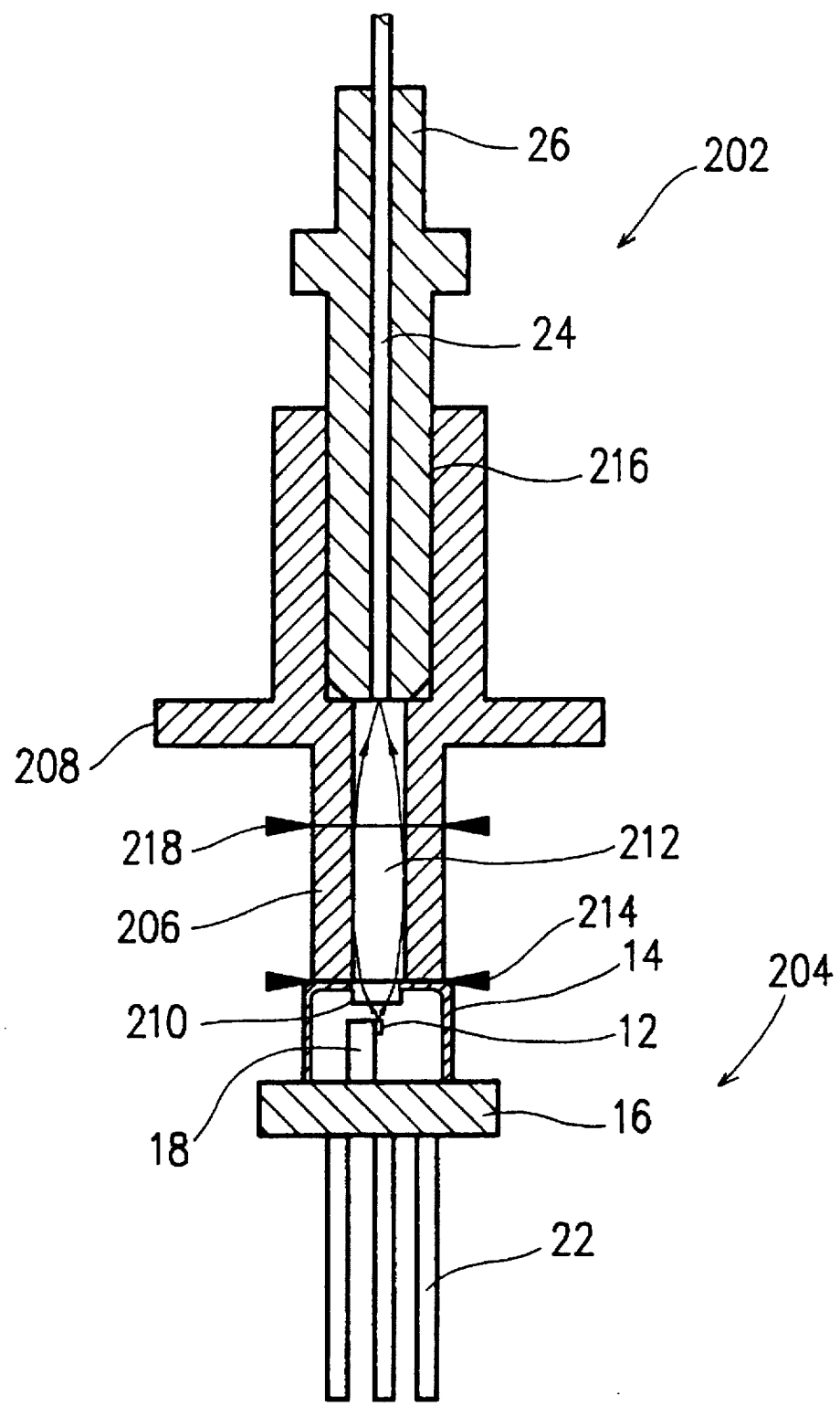
FIG. 14 is a cross-sectional view showing the construction of an optical semiconductor module according to an eighth embodiment.

FIG. 14 shows a cross section of an optical semiconductor module 202 according to an eighth embodiment.

The optical semiconductor module 202 includes a semiconductor light-emitting device 204, a holder 206, and a receptacle 208.

The semiconductor light-emitting device 204 includes a laser diode 12, a protective cap 14, and a stem 16, the laser diode 12 being secured to a mount 18 fixed to the disc-shaped stem 16. The protective cap 14 shrouding the laser diode 12 is also fixed to the stem 16. Light emitted from the laser diode 12 is delivered through a light guide 210 provided in the protective cap 14. The stem 16 and the mount 18 are both made of a ferrous metal whose surface is coated with a gold-plated layer. Terminal pins 22 are connected to the laser diode 12.

The light guide 210 is formed from a glass disc, 2 mm in diameter and 1 mm in thickness. Its outer circumferential surface is coated with a metal-plated layer that acts as a total reflection film, and anti-reflective films are provided on both end faces that are polished to a mirror finish. This light guide 210 is mounted with its inward end face in close proximity to the laser diode 12 (0.5 mm away from the laser diode).

The holder 206 is a hollow cylinder in which a rod-like lens 212 is fixed. The outer circumferential surface of the lens 212 is covered with a metal-plated film that acts as a total reflection film.

The holder 206 is welded at position 214 directly to the protective cap 14 of the semiconductor light-emitting device 204.

The receptacle 208 has a hole 216 for holding the ferrule 26 therein, and is butt-welded at position 218 to the holder 206.

Most of the light emitted from the laser diode 12 enters the light guide 210. The light guide 210 is mounted in a contacting relationship with the lens 212. Of the incident light, light having a large spreading angle is reflected by the metal-plated films formed on the outer circumferential surfaces of the light guide 210 and lens 212, so that the light emitted from the laser diode 12 can be efficiently coupled into the optical fiber 24 through the lens 212.

Since the light guide 210 is spaced 0.5 mm away from the laser diode 12, the light passed through the lens 212 is focused at a point 1 mm from the exit end face of the lens 212. Since the tip of the ferrule 26 inserted in the receptacle 208 stops at a point 1 mm from the exit end face of the lens 212, the axial spacing between the lens 212 and the end of the optical fiber 24 can be determined mechanically by the receptacle 208. Therefore, for optical alignment, the holder 206 is moved relative to the receptacle 208 only in directions perpendicular to the axis.

According to the above construction, the number of housing components can be reduced to two. Furthermore, since adjustments are made only in directions perpendicular to the center axis, optical coupling can be accomplished with ease.

In any of the above-described embodiments, a laser diode is used as the semiconductor light-emitting device, but it will be recognized that other semiconductor light-emitting devices such as light-emitting diodes may be used. Furthermore, a ball lens or other type of lens having a different converging characteristic than that of an aspheric lens may be used as the lens for converging the light emitted from the semiconductor light-emitting device onto the end of the optical fiber. In the above embodiments, the holder, ring, and receptacle are joined together by welding, but depending upon the applications, these components may be joined by using adhesives or means other than welding.

In Embodiment 5, the holder, ring, and receptacle are made of ferritic stainless steel containing a maximum of 0.05% sulphur. In other embodiments also, such ferritic stainless steel containing a maximum of 0.05% sulphur may be used as the material for the holder, ring, and receptacle. Furthermore, the ceramic sleeve used in the optical semiconductor module of Embodiment 6 may also be used in the optical semiconductor modules of other embodiments. Further, in any optical semiconductor module other than that of Embodiment 7, a construction where the optical axis of the lens is tilted out of alignment with the optical axis of the optical fiber may be employed.

Some exemplary values for indices of refraction and other dimensions are mentioned above. It will be appreciated that other values which will enable operation of the invention described also may be used.

Various other modifications will be apparent to and can be readily made by those skilled in the art without departing from the scope and spirit of this invention. Accordingly, it is not intended that the scope of the claims appended hereto be limited to the description as set forth herein, but rather that the claims be broadly construed.

What is claimed is:

1. An optical semiconductor module for holding an optical fiber inserted into a ferrule and for coupling light into the optical fiber, comprising:

a semiconductor light-emitting device;

a ring inside of which the semiconductor light-emitting device is held in a fixed position;

a lens for converging light emitted from the semiconductor light-emitting device;

a holder having a cylindrical hole with the lens fitted in one end thereof and a protrusion formed around the circumference of the other end of the hole, the holder being fixed to the ring after being inserted partway therethrough thereby adjusting the spacing between the lens and the semiconductor light-emitting device; and a receptacle having an inner cylinder for holding the ferrule therein and a recessed portion for holding the protrusion of the holder, and joined to one end of the holder by butting end to end so as to allow the joining ends to be adjusted in directions perpendicular to the optical axis of the lens so that the light converged by the lens is focused on a light receiving end of the optical fiber.

2. A module according to claim 1, wherein the inner cylinder of the receptacle reaches all the way to the recessed portion so that the ferrule is in contact with the protrusion of the holder.

3. A module according to claim 1, wherein the holder and the receptacle are formed from a ferritic stainless steel containing a maximum of 0.05% sulphur.

4. An optical semiconductor module according to claim 1, wherein the cylindrical hole has a diameter equal to a diameter of the lens, and an opening formed on the protrusion of the holder is smaller in diameter than a tip of the ferrule.

5. A method of fabricating an optical semiconductor module for holding an optical fiber inserted into a ferrule and for coupling light into the optical fiber, the method comprising the steps of:

fixing a converging lens in a cylindrically shaped holder;

inserting a semiconductor light-emitting device in the holder;

inserting a ferrule with an optical fiber inserted therein into an inner cylinder for holding the ferrule therein, and butting the receptacle against the holder; and after adjusting the spacing between the semiconductor light-emitting device and the converging lens so that light emitted from the semiconductor light-emitting device is converged by the converging lens onto a light receiving end of the optical fiber, fixing the semiconductor light-emitting device to the holder, moving the holder and the receptacle relative to each other in directions perpendicular to the optical axis of the converging lens, and then fixing the holder to the receptacle, wherein the step of fixing the converging lens comprises the steps of:

inserting the converging lens into a cylinder; and welding the cylinder to the holder.

6. A method of fabricating an optical semiconductor module for holding an optical fiber inserted into a ferrule and for coupling light into the optical fiber, the method comprising the steps of fixing a converging lens in a cylindrically shaped holder;

inserting a semiconductor light-emitting device in the holder;

inserting a ferrule with an optical fiber inserted therein into an inner cylinder for holding the ferrule therein, and butting the receptacle against the holder; and after adjusting the spacing between the semiconductor light-emitting device and the converging lens so that light emitted from the semiconductor light-emitting device is converged by the converging lens onto a light receiving end of the optical fiber, fixing the semiconductor light-emitting device to the holder, moving the holder and the receptacle relative to each other in directions perpendicular to the optical axis of the converging lens, and then fixing the holder to the receptacle, wherein the converging lens is provided with a spacer for determining the spacing between the semiconductor light-emitting device and the converging lens, and the spacing between the semiconductor light-emitting device and the converging lens is adjusted by butting the semiconductor light-emitting device against the spacer.

* * * * *